United States Patent Office.

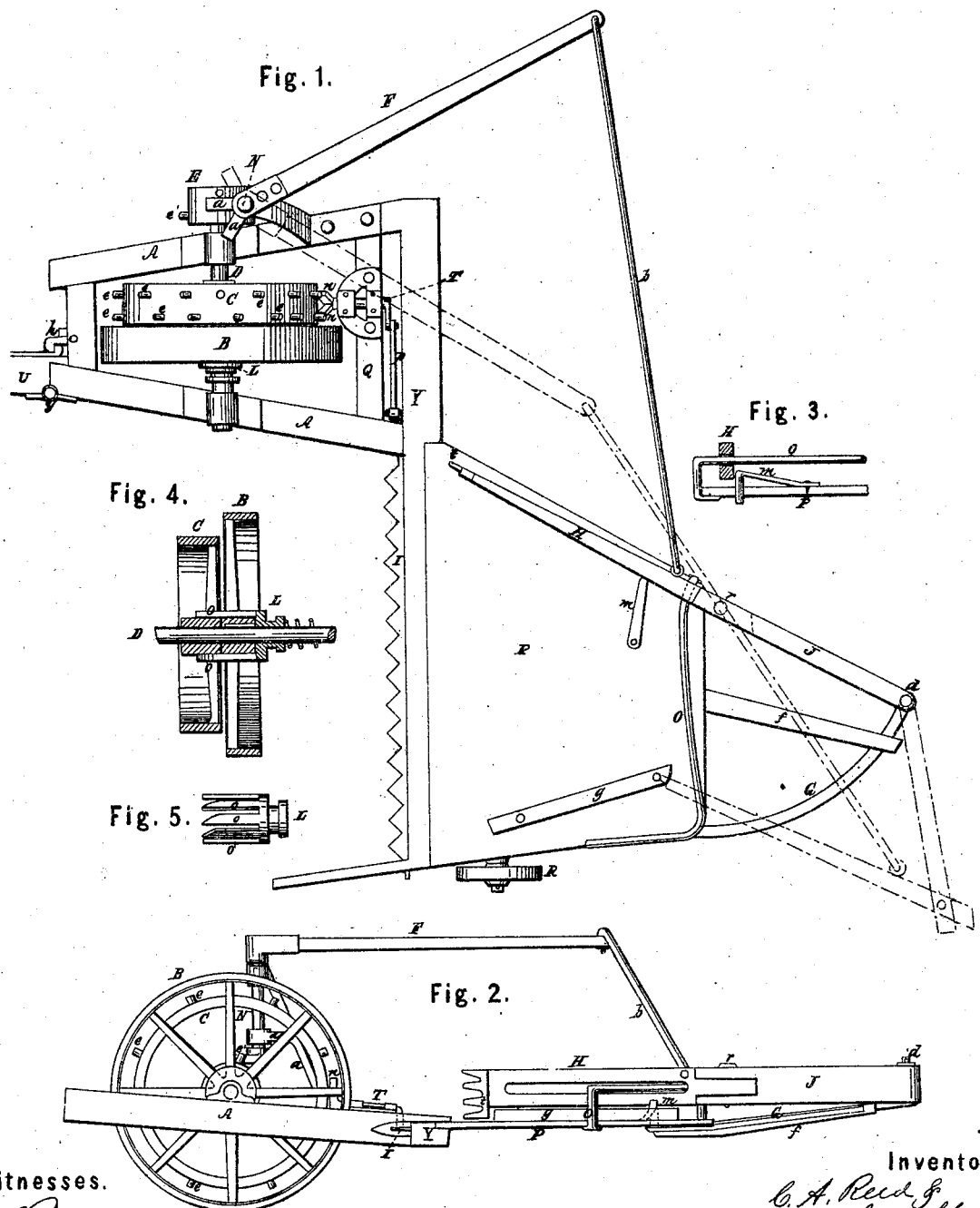

CLEANTHUS A. REED, OF MADISON, AND JAMES M. CAMPBELL, OF BEAVER DAM, WISCONSIN.

Letters Patent No. 93,641, dated August 10, 1869.

---

IMPROVEMENT IN HARVESTERS.

---

The Schedule referred to in these Letters Patent and making part of the same.

---

*To all whom it may concern:*

Be it known that we, CLEANTHUS A. REED, of Madison, Dane county, and JAMES M. CAMPBELL, of Beaver Dam, in the county of Dodge, and State of Wisconsin, have invented certain new and useful Improvements in Machines for Harvesting Grain; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

Our invention relates to machines for cutting or harvesting grain; and consists in a novel construction of the mechanism for operating the same, and in a peculiar method of constructing and operating the rake, for removing the grain from the machine, all as hereinafter more fully explained.

Figure 1 is a top plan view of our machine complete;

Figure 2 is a side elevation of the same; and

Figures 3, 4, and 5, are views of portions shown more in detail.

Our machine is of that class known as single-wheel machines; and we construct the frame of two side-pieces, A, united at the front by a short cross-bar, and at the rear by a longer bar, Y, which latter projects out at one side to the width of the platform, as shown in fig. 1, and forms the finger-bar of the machine, the main frame being nearly triangular in form, with its apex forward.

There is also another cross-bar, Q, reaching from one to the other of the side-bars A, located a short distance in front of the finger-bar Y, to form a bearing for the crank that operates the sickle, as represented in fig. 1.

Within this triangular frame is mounted the bearing-wheel B, upon an axle, D, having its bearings upon the side-bars A, and loosely upon this same axle is mounted another wheel, C, of less diameter, which latter has arranged upon its periphery a series of pins, e, standing alternately in zigzag form, at uniform distances apart, as shown in fig. 1.

A sliding clutch, L, is placed on the axle D, on the inner side of wheel B, with arms o, which extend through between the spokes of both wheels B and C, as represented in fig. 4, thereby locking the two wheels firmly together when shoved in, as represented in fig. 4, but leaving the wheel C free when drawn back.

The arms of this clutch are bevelled or inclined at their ends, as shown in fig. 5, so that when the machine is backed, their inclined ends striking against the arms of the wheel C, will cause the clutch to automatically slide back and release its hold on the wheel C, there being a spiral spring on the axle to throw the clutch in when the machine moves forward.

If desired, there may also be a lever arranged to operate the clutch by hand, and instead of the spiral spring, a weight or spring may be applied to the lever, to shove the clutch in.

The sickle I is arranged at the front of the platform P, in the usual manner, and is connected by a pitman, p, to a rock-shaft or oscillating crank-rod, T, mounted on the cross-bar Q, as represented in fig. 1.

The opposite end of this shaft T is bent at right angles to the crank, and is split, or formed with two arms, n, which latter are so located that as the wheel C revolves, the pins e on its periphery shall strike first against one of the arms n, rocking the shaft in one direction, and then another of the pins shall strike against the other arm n on the opposite side, rocking the shaft T in the other direction, thus imparting to the sickle I the requisite vibratory motion.

This crank-rod or shaft, T, with its crank and arms, we forge of a single solid piece, so that there shall be no joints to give or become loosened.

Upon the end of the axle which extends out beyond the side of the frame, as shown in fig. 1, we secure another wheel, E, having a series of pins, e', on its periphery, arranged the same as those on wheel C; and just in rear of this wheel we mount, in suitable supports, a vertical shaft, N, to the lower portion of which is rigidly affixed a forked arm, a, which is operated by the pins e' in the same manner as the crank-shaft T, previously described.

To the upper end of the vertical shaft N is secured, rigidly, a rod, F, as represented in figs. 1 and 2, and from the outer end of this arm or rod F extends a rod, b, having its opposite end pivoted to the rake H, for the purpose of imparting motion thereto.

The rake consists of a piece of board or bar, H, connected by a joint at its rear end to a swinging arm, J, which latter is pivoted, at its rear end, to a bar, G, there being a brace or bar, f, projecting backward from the platform to support and hold the bar G firmly in position.

The rake H is slotted, as shown in figs. 2 and 3, and is supported and slides on a guide-rod, O, secured to the rear side of the platform, as represented in figs. 1 and 2.

A guide-block or cleat, g, is secured upon the face of the platform, near the edge next to the grain, as shown in fig. 1, and to the front end of the rake H, there is secured a metallic piece, t, which has a shoulder projecting a little below the lower face of the rake, so that when it is shoved around behind the guide g it will engage against the same, and thus serve to guide the rake in its forward motion to the front of the platform, preparatory to its sweeping off the grain.

Upon the platform P there is also secured a spring-stop, *m*, as represented in figs. 1 and 3, for the purpose of preventing the rake from returning across the platform in the direction in which it came, this stop *m* being arranged to yield and let the rake pass over it as it sweeps the grain off, and then spring up behind the rake, and prevent it from passing back in the same line.

With the parts thus constructed and arranged, it will be seen that as the wheel E revolves the pins thereon will impart to the shaft N and its arm F a reciprocating motion, at intervals, more or less frequent, according to the distance apart of the pins *e'*.

As the arm F is thrown around, as shown in red, the rake H, which is prevented from sliding back across the platform by the spring-stop *m*, is caused to slide back until its front end passes behind the stop *m*, when it is shoved across to the opposite side of the platform, as shown in red in fig. 1, the shoulder on the metallic point *t* passing around behind the guide *g*, when the return-motion of the arm F, pulling on the rear portion of the rake H, causes its front end to slide forward along the guide *g* to the front of the platform, from whence the rake is drawn bodily across the platform, sweeping the grain along with it, and delivering it at the edge, behind the main frame.

By this method of constructing a machine, we produce one that is exceedingly simple and compact, there being no gear-wheels, and but very few parts to wear or get out of order.

As shown in fig. 1, we unite the tongue U to front inner corner of the main frame, by a hinge-joint, *y*, and provide a strong hook, *h*, to hold or lock it rigidly in position when in use. This arrangement of the tongue serves to relieve the machine, more or less, of side draught, and the joint permits it to be doubled back out of the way when it is desired to store or ship the machine, and still be always attached ready for use when desired.

Having thus described our invention,

What we desire to secure by Letters Patent, is—

1. The combination of the tread or bearing-wheel B, loose wheel C, provided with the pins *e*, clutch L, and crank-rod T, all constructed and arranged substantially as described.

2. The rake H, jointed to the pivoted rod J, supported on the guide-rod O, and guided in its movements by the stop *m* and guide *g*, or their equivalents, substantially as herein set forth.

3. The arrangement of the wheel E, shaft N, with its arms *a* and F, and rod *b*, for operating the rake, as herein shown and described.

OLEANTHUS A. REED.
JAMES M. CAMPBELL.

Witnesses:
JOHN BECKER,
ABIATHAR JOY.